(12) United States Patent
Kashiyama (10) Patent No.: US 12,148,190 B2
(45) Date of Patent: Nov. 19, 2024

(54) INFORMATION PROCESSING APPARATUS WITH FACE AUTHENTICATION AND CONTROL METHOD

(71) Applicant: Lenovo (Singapore) Pte. Ltd., Singapore (SG)

(72) Inventor: Hideki Kashiyama, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 102 days.

(21) Appl. No.: 18/148,427

(22) Filed: Dec. 29, 2022

(65) Prior Publication Data
US 2023/0260243 A1 Aug. 17, 2023

(30) Foreign Application Priority Data
Feb. 14, 2022 (JP) .................... 2022-020636

(51) Int. Cl.
*G06V 10/143* (2022.01)
*G06T 7/70* (2017.01)
(Continued)

(52) U.S. Cl.
CPC .............. *G06V 10/143* (2022.01); *G06T 7/70* (2017.01); *G06V 10/60* (2022.01); *G06V 40/161* (2022.01); *G06V 40/166* (2022.01); *H04N 23/00* (2023.01); *H04N 23/11* (2023.01); *H04N 23/45* (2023.01); *H04N 23/56* (2023.01);
(Continued)

(58) Field of Classification Search
CPC ........ H04N 23/00; H04N 23/11; H04N 23/45; H04N 23/56; H04N 23/61; H04N 23/611; H04N 23/667; H04N 23/65; H04N 23/651; H04N 25/709; G06V 10/143; G06V 10/60; G06V 40/161; G06V 40/166; G06T 7/70; G06T 2207/10152; G06T 2207/30201; Y02D 10/00
See application file for complete search history.

(56) References Cited

U.S. PATENT DOCUMENTS

2016/0057371 A1* 2/2016 Uosawa .................. A63F 13/50
348/164

FOREIGN PATENT DOCUMENTS

JP 2009-201064 A 9/2009
JP 2014142851 A * 8/2014 ............... G06F 1/32
JP 2016-046634 A 4/2016

* cited by examiner

*Primary Examiner* — Twyler L Haskins
*Assistant Examiner* — Akshay Trehan
(74) *Attorney, Agent, or Firm* — Osha Bergman Watanabe & Burton LLP (57) ABSTRACT

An information processing apparatus includes a processor that processes first imaging data captured by a first imaging function using visible light and second imaging data captured by a second imaging function using infrared light; and a light-emitting part that outputs infrared light toward an imaging target by the second imaging function. The processor detects a face area from an image of the first imaging data, detects the brightness of the imaging target based on the first imaging data stored in a memory, and when the brightness detected is equal to or more than a predetermined threshold value, the processor controls the output of the light-emitting part depending on whether or not the face area is detected, while when the brightness is less than the predetermined threshold value, the processor controls the output of the light-emitting part regardless of detection of the face area.

7 Claims, 7 Drawing Sheets

(51) Int. Cl.
*G06V 10/60* (2022.01)
*G06V 40/16* (2022.01)
*H04N 23/00* (2023.01)
*H04N 23/11* (2023.01)
*H04N 23/45* (2023.01)
*H04N 23/56* (2023.01)

(52) U.S. Cl.
CPC ............... *G06T 2207/10152* (2013.01); *G06T 2207/30201* (2013.01); *Y02D 10/00* (2018.01)

INFORMATION PROCESSING APPARATUS WITH FACE AUTHENTICATION AND CONTROL METHOD

CROSS-REFERENCE TO RELATED APPLICATIONS

This application claims priority to Japanese Patent Application No. 2022-20636 filed on Feb. 14, 2022, the contents of which are hereby incorporated herein by reference in their entirety.

BACKGROUND OF THE INVENTION

Field of the Invention

The present invention relates to an information processing apparatus and a control method.

Description of the Related Art

There is disclosed a technique for recognizing a subject based on a visible light image obtained with a visible light camera and an infrared image (infrared light image) obtained with an infrared camera (for example, Japanese Unexamined Patent Application Publication No. 2009-201064). In recent years, there have been techniques for performing face authentication of a user using an infrared camera at the boot-up of a PC (personal computer) and for performing face authentication of the user using both the infrared camera and a visible light camera in order to make the face authentication more accurate.

When the infrared camera is used, there is a need to emit and irradiate infrared light on an imaging target, but the emission of infrared light consumes a lot of power and it can also be a heat source. Although it is desirable for a PC to reduce power consumption as much as possible, there is a need to continue to emit infrared light in order to retain the function of the infrared camera while the face authentication function is working. For example, when the PC is placed on a desk next to a person who is watching TV, when a person touches a key, a touch pad, or the like to boot up a sleeping PC while trying to move the sleeping PC, or the like, the face authentication function may be made to work even though the person has no intention to use the PC.

Thus, when the face authentication function is made to work and the emission of infrared light is continued even though the person has no intention to use the PC, power is consumed wastefully. In order to deal with this, when a face itself is not detected, it is determined that there is no user who wants to use the PC (there is no target on which face authentication is performed), and control to stop the emission of infrared light is considered. However, since there is a case where any face cannot be detected in a dark place even if there is a user who wants to use the PC, there is concern that the face authentication function may not work properly.

SUMMARY OF THE INVENTION

One or more embodiments provide an information processing apparatus and a control method capable of making a face authentication function work properly while reducing power consumption.

An information processing apparatus according to the first aspect of the present invention includes: a memory which temporarily stores first imaging data, captured by a first imaging function for imaging using visible light, and second imaging data captured by a second imaging function for imaging using infrared light; a light-emitting part which outputs infrared light toward an imaging target by the second imaging function; and a processor which executes processing based on the first imaging data and the second imaging data stored in the memory, wherein the processor performs face detection processing to detect a face area with a face captured therein from an image included in the first imaging data based on the first imaging data stored in the memory, brightness detection processing to detect the brightness of the imaging target based on the first imaging data stored in the memory, and light emission control processing in which when the brightness detected by the brightness detection processing is equal to or more than a predetermined threshold value upon imaging by the second imaging function, a first control mode to control output of the light-emitting part is executed depending on whether or not the face area is detected by the face detection processing, while when the brightness is less than the predetermined threshold value, a second control mode to control the output of the light-emitting part is executed regardless of detection of the face area.

The above information processing apparatus may also be such that in the light emission control processing, the processor outputs infrared light from the light-emitting part in the first control mode when the face area is detected, and does not output infrared light from the light-emitting part when the face area is not detected.

The above information processing apparatus may further be such that in the light emission control processing, the processor outputs infrared light from the light-emitting part in the second control mode regardless of detection of the face area.

Further, the above information processing apparatus may be such that in the face detection processing, the processor further detects the orientation of a face included in the face area when the face area is detected, and in the light emission control processing, the processor controls whether or not to output infrared light from the light-emitting part in the first control mode based on the orientation of the face included in the face area even when the face area is detected.

Further, the above information processing apparatus may be such that in the light emission control processing, the processor outputs infrared light intermittently from the light-emitting part in the second control mode regardless of detection of the face area.

Further, the above information processing apparatus may be such that in the second control mode, after outputting infrared light from the light-emitting part regardless of detection of the face area in the light emission control processing, the processor detects, in the face detection processing, a face area with a face captured therein from an image included in the second imaging data based on the second imaging data stored in the memory, and when the face area is not detected, the processor stops the output of infrared light from the light-emitting part for a certain amount of time.

The above information processing apparatus may further include: a first camera which outputs the first imaging data by the first imaging function; and a second camera which outputs the second imaging data by the second imaging function.

Alternatively, the above information processing apparatus may further include one camera which outputs both the first imaging data by the first imaging function and the second imaging data by the second imaging function.

Further, a control method for an information processing apparatus according to the second aspect of the present invention is a control method for an information processing apparatus including: a memory which temporarily stores first imaging data, captured by a first imaging function for imaging using visible light, and second imaging data captured by a second imaging function for imaging using infrared light; a light-emitting part which outputs infrared light toward an imaging target by the second imaging function; and a processor which executes processing based on the first imaging data and the second imaging data stored in the memory, the control method including: a face detection step of causing the processor to detect a face area with a face captured therein from an image included in the first imaging data based on the first imaging data stored in the memory; a brightness detection step of causing the processor to detect the brightness of the imaging target based on the first imaging data stored in the memory; and a light emission control step in which when the brightness detected in the brightness detection step is equal to or more than a predetermined threshold value upon imaging by the second imaging function, the processor controls output of the light-emitting part depending on whether or not the face area is detected in the face detection step, while when the brightness is less than the predetermined threshold value, the processor controls the output of the light-emitting part regardless of detection of the face area.

The above-described aspects of the present invention can make a face authentication function work properly while reducing power consumption.

DETAILED DESCRIPTION OF THE INVENTION

Embodiments of the present invention will be described below with reference to the accompanying drawings.

First Embodiment

First, the outline of an information processing apparatus 1 according to a first embodiment will be described. The information processing apparatus according to the present embodiment is, for example, a clamshell (laptop) PC (Personal Computer).

[Appearance Configuration of Information Processing Apparatus]

Figure 1:
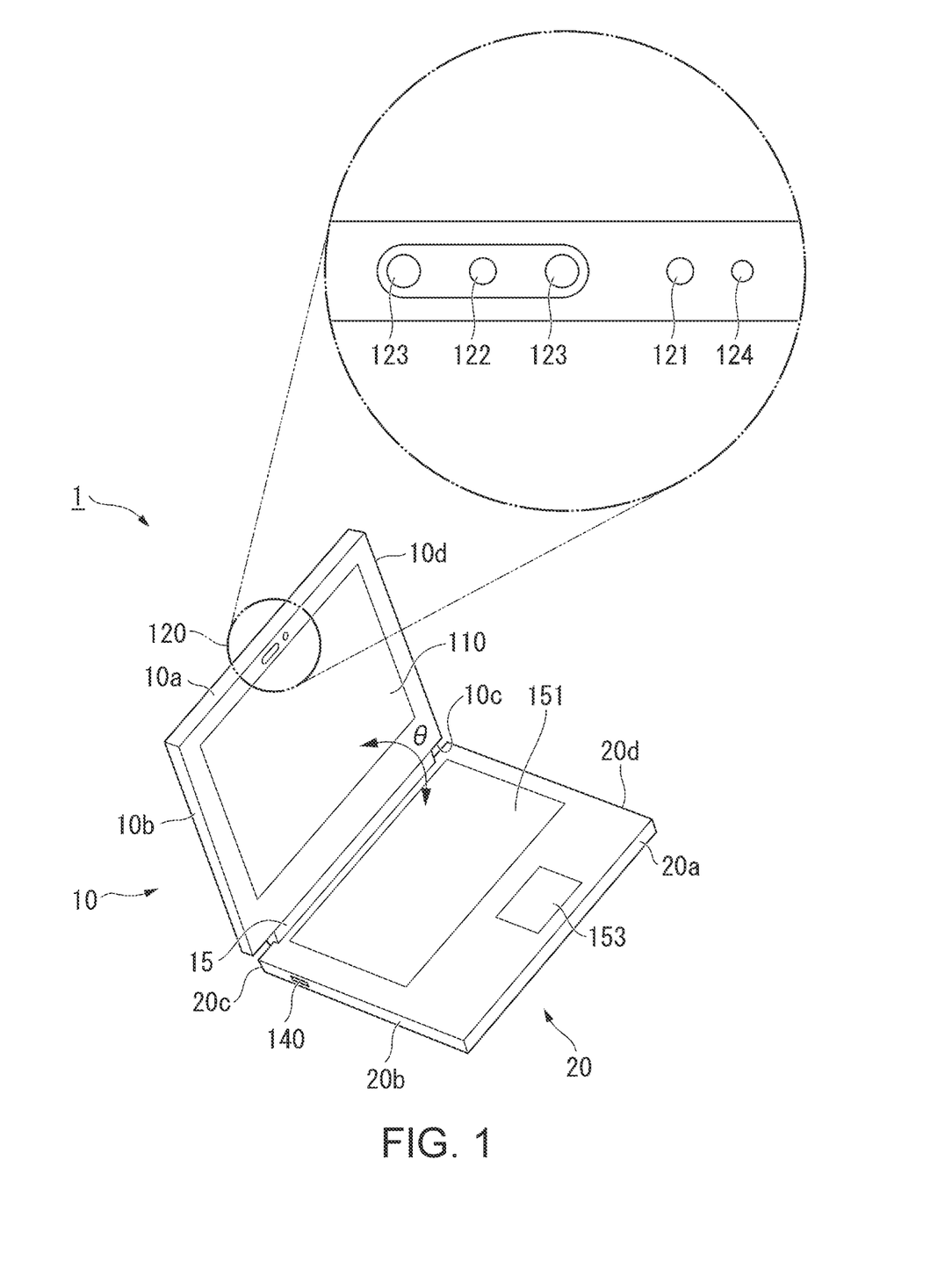
FIG. 1 is a perspective view illustrating an appearance configuration example of an information processing apparatus according to a first embodiment.

FIG. 1 is a perspective view illustrating an appearance configuration example of the information processing apparatus according to the present embodiment.

The information processing apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, a camera unit 120 is provided in a peripheral area of the display unit 110 on the inner face of the first chassis 10. For example, the camera unit 120 is arranged on the side of the side face 10a in the peripheral area of the display unit 110. Note that the position at which the camera unit 120 is arranged is just an example, and it may be elsewhere as long as the camera unit can face a direction (frontward) to face the inner face of the first chassis 10.

In the open state, the camera unit 120 captures an image in a predetermined imaging range in the direction (frontward) to face the inner face of the first chassis 10. The predetermined imaging range is a range of angles of view defined by an image sensor included in the camera unit 120 and an optical lens provided in front of the imaging surface of the image sensor. For example, the camera unit 120 can capture an image including a person (user) present in front of the information processing apparatus 1.

Further, the camera unit 120 includes two cameras of an RGB camera 121 and an IR camera 122, two IR light-emitting parts 123, and an indicator 124. In the indicator 124, a light-emitting element is provided to light up according to the operation of the camera unit 120. As the light-emitting element, for example, an LED (Light Emission Diode) is used. This indicator 124 is to inform the user that the function of the camera unit 120 is working, and the power consumption thereof is low.

The RGB camera 121 is a camera having an imaging function for imaging using visible light. For example, the RGB camera 121 is configured to include an RGB image sensor in which R pixels each having a color filter that transmits light in a wavelength band of R (Red), G pixels each having a color filter that transmits light in a wavelength band of G (green), and B pixels each having a color filter that transmits light in a wavelength band of B (blue) are arranged. The RGB camera 121 outputs, as imaging data, RGB image (visible light image) data obtained by photo-electrically converting visible light incident through the RGB color filters.

The IR camera 122 is a camera having an imaging function for imaging using infrared light. For example, the IR camera 122 is configured to include an IR image sensor in which IR (InfraRed) pixels on which infrared light can be incident are arranged. Since no color filter is provided on the IR pixels, light including the infrared light is incident thereon. The IR light-emitting parts 123 output infrared light to be irradiated onto an imaging target an image of which is captured with the IR camera 122. Reflected light of infrared light output from the IR light-emitting parts 123 is incident on the IR camera 122, and the IR camera 122 outputs, as imaging data, IR image (infrared image) data obtained by photoelectrically converting light including the incident infrared light.

Here, the IR light-emitting parts 123 are, for example, LEDs (IR LEDs) to output infrared light. The power consumption when the IR light-emitting parts 123 output the infrared light is much higher than the power consumptions of the RGB camera 121, the IR camera 122, and the indicator 124. Note that the IR light-emitting parts 123 are not limited to the LEDs as long as they output infrared light. For example, each of the IR light-emitting parts 123 may also be a laser that outputs infrared light.

Further, a power button 140 is provided on the side face 20*b* of the second chassis 20. The power button 140 is an operator used by the user to give an instruction to power on or power off. For example, when the power button 140 is operated in a power-off state (shutdown state) or a standby state (standby, sleep, or the like), the information processing apparatus 1 is powered on and booted. Further, when the power button 140 is operated in a normal operating state, the information processing apparatus 1 is shut down and powered off.

Further, a keyboard 151 and a touch pad 153 are provided as input devices on the inner face of the second chassis 20. Note that a touch sensor may also be included as an input device instead of or in addition to the keyboard 151 and the touch pad 153, or a mouse or an external keyboard may be connected. When the touch sensor is provided, an area corresponding to the display surface of the display unit 110 may be constructed as a touch panel to accept operations. Further, a microphone used to input voice may be included as an input device.

In the closed state where the first chassis 10 and the second chassis 20 are closed, the display unit 110 and the camera unit 120 provided on the inner face of the first chassis 10, and the keyboard 151 and the touch pad 153 provided on the inner face of the second chassis 20 are covered with each other's chassis faces, respectively, and become incapable of functioning. The information processing apparatus 1 may also be booted from the power-off state (shutdown state) or the standby state (standby, sleep, or the like) by changing the information processing apparatus 1 from the closed state to the open state. Further, in the standby state (standby, sleep, or the like), when the keyboard 151 or the touch pad 153 is operated, the information processing apparatus 1 may be booted from the standby state (standby, sleep, or the like).

[Outline of Output Control of Infrared Light]

Next, the outline of output control of infrared light executed by the information processing apparatus 1 will be described.

Figure 2A:
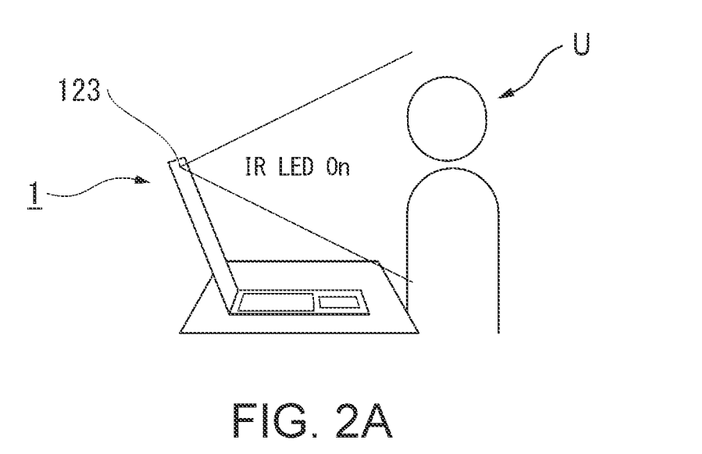
FIGS. 2A and 2B are illustrations of the outline of output control of infrared light according to the first embodiment.
Figure 2B:
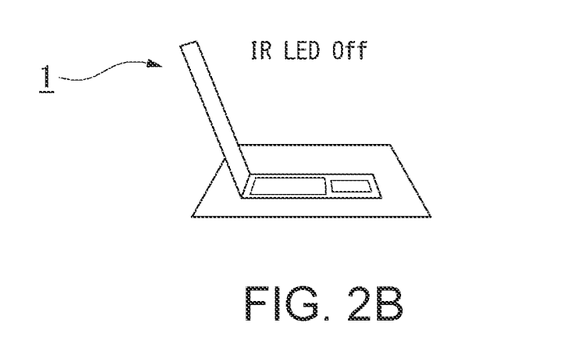

FIGS. 2A and 2B are illustrations of the outline of output control of infrared light according to the present embodiment. The information processing apparatus 1 performs user authentication using a face authentication function at system boot. While the face authentication function is working, both the function of the RGB camera 121 and the function of the IR camera 122 are enabled. Here, there is a need to output infrared light from the IR light-emitting parts 123 in order to enable the function of the IR camera 122. However, when outputting the infrared light, power consumption increases and it can also be a heat source.

Therefore, the information processing apparatus 1 detects a face area with a face captured therein from an RGB image included in an RGB image data captured with the RGB camera 121, and controls output of the IR light-emitting parts 123 depending on whether or not the face area is detected.

For example, as illustrated in FIG. 2A, when user U is present in front of the information processing apparatus 1, the information processing apparatus 1 detects a face area from an RGB image. When the face area is detected, the information processing apparatus 1 outputs infrared light from the IR light-emitting parts 123 (IR LED On). On the other hand, as illustrated in FIG. 2B, when no user U is present in front of the information processing apparatus 1, the information processing apparatus 1 cannot detect any face area from the RGB image. When no face area is detected, the information processing apparatus 1 does not output infrared light from the IR light-emitting parts 123 (IR LED Off).

Thus, since the information processing apparatus 1 does not output infrared light when no user is present, power can be prevented from being consumed wastefully. However, even when the user is present in front of the information processing apparatus 1 in a dark place, it is difficult to detect facial feature information from the RGB image, and hence any face area may not be able to be detected. Therefore, the information processing apparatus 1 detects the brightness of the imaging target based on the RGB image data, and in the dark place, the output of the IR light-emitting parts 123 is controlled regardless of detection of the face area.

Figure 3A:
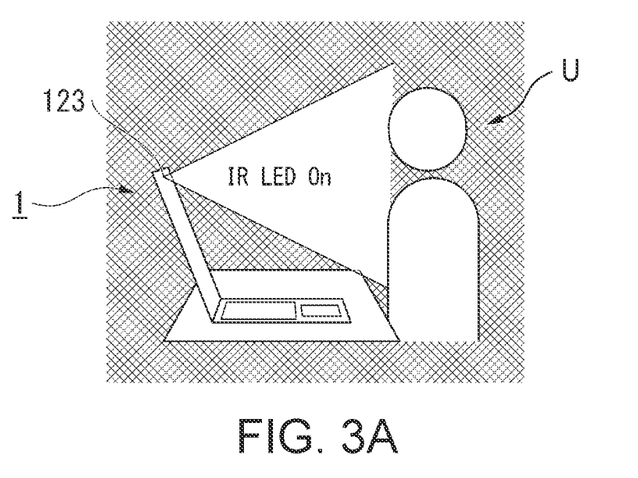
FIGS. 3A and 3B are illustrations of the outline of output control of infrared light in a dark place according to the first embodiment.
Figure 3B:
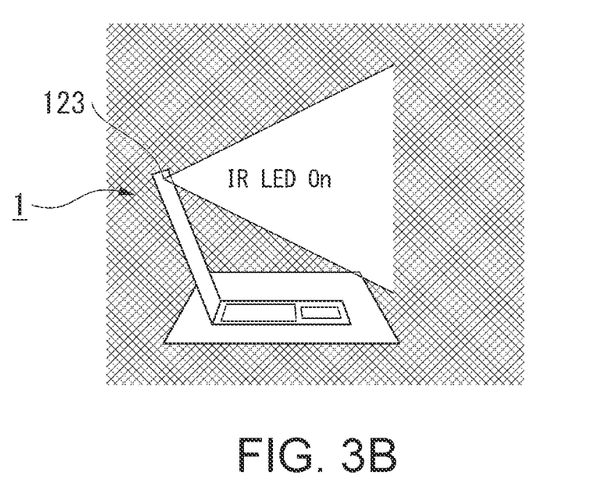

FIGS. 3A and 3B are illustrations of the outline of output control of infrared light in the dark place according to the present embodiment. Since the detection accuracy of the face area from the RGB image is reduced in the dark place, the information processing apparatus 1 cannot correctly detect a case where user U is present in front (FIG. 3A) and a case where no user U is present (FIG. 3B). Therefore, when the function of the IR camera 122 is enabled, the information processing apparatus 1 outputs infrared light from the IR light-emitting parts 123 (IR LED On) regardless of detection of the face area.

Thus, since the information processing apparatus 1 not only controls the output of the IR light-emitting parts 123 depending on whether or not the face area is detected from the RGB image captured with the RGB camera 121, but also outputs infrared light from the IR light-emitting parts 123 in the dark place regardless of detection of the face area, the face authentication function can be made to work properly while reducing power consumption. The configuration of the information processing apparatus 1 will be described in detail below.

[Hardware Configuration of Information Processing Apparatus]

Figure 4:
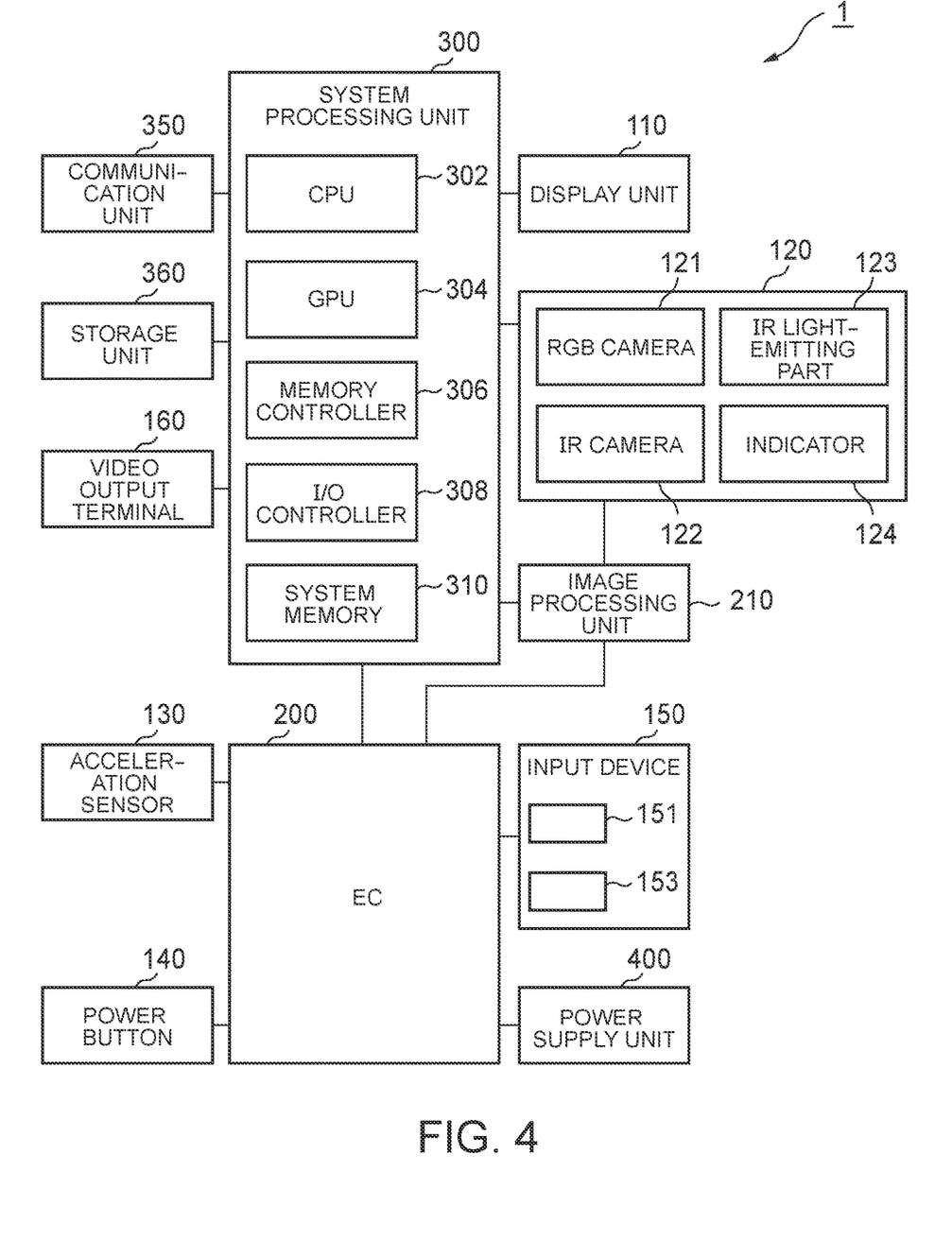
FIG. 4 is a block diagram illustrating an example of the hardware configuration of the information processing apparatus according to the first embodiment.

FIG. 4 is a block diagram illustrating an example of the hardware configuration of the information processing apparatus 1 according to the present embodiment. In FIG. 4, components corresponding to respective components in FIG. 1 are given the same reference numerals. The information processing apparatus 1 is configured to include the display unit 110, the camera unit 120, an acceleration sensor 130, the power button 140, an input device 150, a video output terminal 160, an EC (Embedded Controller) 200, an image processing unit 210, a system processing unit 300, a communication unit 350, a storage unit 360, and a power supply unit 400. The display unit 110 displays display data (images) generated based on system processing executed by the system processing unit 300, processing of an application program running on the system processing, and the like.

The camera unit 120 includes the RGB camera 121, the IR camera 122, the IR light-emitting parts 123, and the indicator 124. The RGB camera 121 captures an image of an imaging target within a predetermined angle of view in a direction (frontward) to face the inner face of the first chassis 10, and outputs captured RGB image data. The IR camera 122 captures an image of the imaging target within a predetermined angle of view in a direction (frontward) to face the inner face of the first chassis 10, and outputs captured IR image data. The IR light-emitting parts 123 output infrared light to be irradiated onto the imaging target the image of which is captured with the IR camera 122. The indicator 124 lights up according to the operation of the camera unit 120. The RGB image data and the IR image data output by the camera unit 120 are temporarily stored in the system memory 310.

The acceleration sensor 130 detects the orientation of the information processing apparatus 1 with respect to the direction of gravity, and outputs a detection signal indicative of the detection result to the EC 200. For example, the acceleration sensor 130 is provided in each of the first chassis 10 and the second chassis 20 to detect each of the orientation of the first chassis 10 and the orientation of the second chassis 20, and output, to the EC 200, each of detection signals indicative of the detection results, respectively. Based on the detection results of the orientation of the first chassis 10 and the orientation of the second chassis 20, the open/closed state of the electronic apparatus 1, the open angle θ between the first chassis 10 and the second chassis 20, and the like can be detected. Note that a gyro sensor, a tilt sensor, a geomagnetic sensor, and the like may also be included instead of or in addition to the acceleration sensor 130.

The power button 140 outputs, to the EC 200, an operation signal according to a user's operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation content.

The video output terminal 160 is a connection terminal for connection to an external display (display device). For example, the video output terminal 160 is an HDMI (registered trademark) terminal, a USB Type-C terminal, a display port, or the like.

The power supply unit 400 supplies power through a power system for supplying power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery pack, into a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), a flash ROM, multi-channel A/D input terminal and D/A output terminal, digital input/output terminals, and the like. For example, the CPU of the EC 200 reads a control program (firmware) prestored in the ROM or an external ROM and executes the read control program to fulfill the function. The EC 200 is connected to the acceleration sensor 130, the power button 140, the input device 150, the image processing unit 210, the system processing unit 300, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1.

Further, the EC 200 acquires operation signals from the input device 150 and the like, and outputs, to the system processing unit 300, an operation signal required in processing of the system processing unit 300 among the acquired operation signals. Further, the EC 200 acquires the detection signal from the acceleration sensor 130 to detect, based on the acquired detection signal, the orientation of the information processing apparatus 1 (the orientation of the first chassis 10 and the orientation of the second chassis 20), the open angle θ (open/closed state) between the first chassis 10 and the second chassis 20, and the like.

Further, based on the operation signal from the power button 140, the operation signal from the input device 150, the open/closed state of the information processing apparatus 1, and the like, the EC 200 outputs, to the system processing unit 300, a boot signal to boot the system.

Note that some of the functions of the EC 200 may also be configured as a sensor hub or a chipset.

The image processing unit 210 is a processor (ISP: Image Signal Processor) which processes imaging data captured by the camera unit 120. For example, the image processing unit 210 acquires imaging data (RGB image data, IR image data) captured by the camera unit 120, and based on the acquired imaging data, executes detection processing to detect a face area, brightness detection processing to detect the brightness of an imaging target, face authentication processing to authenticate a face included in the detected face area, and the like. Further, the image processing unit 210 controls the IR light-emitting parts 123 and the indicator 124. The functional configuration of this image processing unit 210 will be described in detail later.

The system processing unit 300 is configured to include a CPU (Central Processing Unit) 302, a GPU (Graphic Processing Unit) 304, a memory controller 306, an I/O (Input-Output) controller 308, and the system memory 310, where processing of various application programs is executable on an OS (Operating System) by system processing based on the OS. The CPU 302 and the GPU 304 may be collectively called a processor.

The CPU 302 executes processing by the OS and processing by the application programs running on the OS. Further, the CPU 302 causes the operating state of the system to make a transition according to an instruction from the EC 200. For example, when receiving a boot instruction from the EC 200 in such a case that the operating state is the power-off state or the standby state, the CPU 302 executes boot processing to make the transition from the power-off state or the standby state to the normal operating state. Further, when receiving an instruction to make the transition to the standby state in the normal operating state, the CPU 302 makes the transition from the normal operating state to the standby state. Further, when receiving a shutdown instruction in the normal operating state, the CPU 302 executes shutdown processing to make the transition from the normal operating state to the power-off state.

Further, the CPU 302 executes login processing to determine whether or not to allow access to the OS in the boot processing. When the boot processing by the OS is started, the CPU 302 executes the login processing before allowing the access to the OS, and the transition to the normal operating state is paused until login is allowed in the login processing. In the login processing, user authentication processing is performed to determine whether or not a person using the information processing apparatus 1 is a preregistered, authorized user. As the authentication, there are password authentication, face authentication, fingerprint authentication, and the like. In the present embodiment, the CPU 302 executes the login processing using face authentication based on the processing of the OS.

When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading and writing data from and to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores imaging data (RGB image data, IR image data) captured by the camera unit 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a ROM, a flash ROM, and the like. The storage unit 360 stores the OS, device drivers, various programs such as applications, and various data acquired by the operation of the programs.

Note that the system processing unit 300 may be configured as one package as a SoC (System on a Chip), or some of the functions may be configured as any other part such as a chipset or a sensor hub.

[Functional Configuration of Image Processing Unit]

Next, the functional configuration of the image processing unit 210 will be described in detail.

Figure 5:
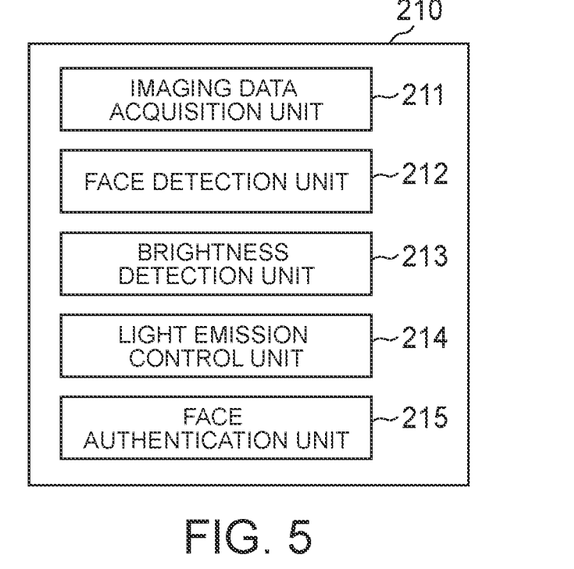
FIG. 5 is a block diagram illustrating an example of the functional configuration of an image processing unit according to the first embodiment.

FIG. 5 is a block diagram illustrating an example of the functional configuration of the image processing unit 210 according to the present embodiment. The image processing unit 210 illustrated includes an imaging data acquisition unit 211, a face detection unit 212, a brightness detection unit 213, a light emission control unit 214, and a face authentication unit 215, and when the face authentication function is made to work, output control of the IR light-emitting parts 123 described with reference to FIGS. 2A and 2B and FIGS. 3A and 3B is executed.

The imaging data acquisition unit 211 acquires, from the system memory 310, RGB image data captured with the RGB camera 121 and IR image data captured with the IR camera 122.

The face detection unit 212 executes a face detection function to detect a face area from an RGB image included in the RGB image data. As the face detection method to detect the face area, any detection method using a face detection algorithm to detect a face based on facial feature information, using trained data (learned model) subjected to machine learning based on the facial feature information or the face image, using a face detection library, or the like can be applied.

Note that the face detection function used for output control of the IR light-emitting parts 123 does not need to be a high-performance face detection function capable of detecting not only a front face but also a profile (facing left or right) as long as at least a face area of a face facing the front (facing the information processing apparatus 1) can be detected. This is because the face cannot be authenticated from an image of a face not facing the front such as a profile. In the output control of the IR light-emitting parts 123, it is desired that the determination of whether or not the face area is detected should be the determination of whether or not the face area of a face the authentication of which is possible is detected.

The brightness detection unit 213 executes brightness detection processing to detect the brightness of the imaging target based on the RGB image data. The brightness of the imaging target can be calculated from an average value of the luminance values of respective pixels of the RGB image data, or the like.

Based on the brightness detected by the brightness detection unit 213, the light emission control unit 214 determines whether or not the imaging target is in the "dark place." For example, when the brightness detected by the brightness detection unit 213 is less than a predetermined threshold value, the light emission control unit 214 determines the "dark place." On the other hand, when the brightness detected by the brightness detection unit 213 is equal to or more than the predetermined threshold value, the light emission control unit 214 determines that it is not the "dark place" (hereinafter called a "bright place").

The "predetermined threshold value" mentioned above is preset based on a brightness with which the detection of the face area is possible. In other words, the bright place has a brightness with which the detection of the face area is possible, and the dark place has a brightness with which the detection of the face area is difficult.

In the case of a bright place upon imaging with the IR camera 122, the light emission control unit 214 controls the output of the IR light-emitting parts 123 depending on whether or not the face area is detected by the face detection unit 212. A control mode to perform control in the case of this bright place is also called a bright-place control mode (first control mode). For example, when the face area is detected by the face detection unit 212 in the bright-place control mode, the light emission control unit 214 outputs infrared light from the IR light-emitting parts 123, while when no face area is detected, the light emission control unit 214 does not output infrared light from the IR light-emitting parts 123.

On the other hand, in the case of a dark place upon imaging with the IR camera 122, the light emission control unit 214 controls the output of the IR light-emitting parts 123 regardless of detection of the face area by the face detection unit 212. A control mode to perform control in the case of this dark place is also called a dark-place control mode (second control mode). For example, in the dark-place control mode, the light emission control unit 214 outputs infrared light from the IR light-emitting parts 123 regardless of detection of the face area by the face detection unit 212.

Based on the IR image data captured with the IR camera 122, the face authentication unit 215 detects a face area with a face captured therein from an IR image included in the IR image data, and executes face authentication processing by checking an image of the face area against a preregistered face image (for example, a face image of an authorized user).

[Operation of Output Control Processing of IR Light-Emitting Parts]

Figure 6:
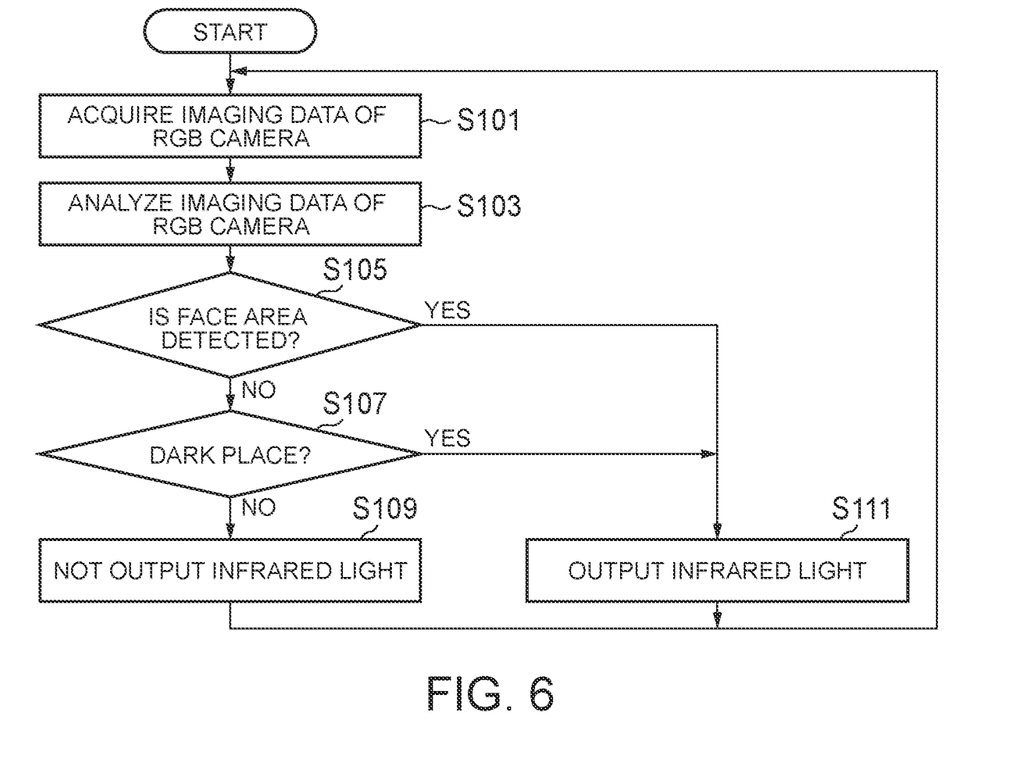
FIG. 6 is a flowchart illustrating an example of output control processing of IR light-emitting parts according to the first embodiment.

Referring next to FIG. 6, the operation of output control processing in which the image processing unit 210 controls whether or not to output infrared light from the IR light-emitting parts 123 will be described.

FIG. 6 is a flowchart illustrating an example of output control processing of the IR light-emitting parts 123 according to the present embodiment. This output control processing of the IR light-emitting parts 123 is executed when user authentication is performed using the face authentication function at the boot-up of the information processing apparatus 1. Both an imaging function with the RGB camera 121 and an imaging function with the IR camera 122 are enabled according to the operation of the face authentication function.

(Step S101) The image processing unit 210 acquires, from the system memory 310, RGB image data captured with the RGB camera 121. Then, the image processing unit 210 proceeds to a process in step S103.

(Step S103) The image processing unit 210 analyzes the RGB image data acquired in step S101. For example, the image processing unit 210 detects a face area from an RGB image included in the RGB image data. Further, the image processing unit 210 detects the brightness of an imaging target based on the RGB image data. Then, the image processing unit 210 proceeds to a process in step S105.

(Step S105) The image processing unit 210 determines whether or not a face area is detected from the RGB image in step S103. When determining that the face area is detected from the RGB image (YES), the image processing unit 210 proceeds to a process in step S111. On the other hand, when determining that no face area is detected from the RGB image (NO), the image processing unit 210 proceeds to a process in step S107.

(Step S107) Based on the brightness detected in step S103, the image processing unit 210 determines whether or not the imaging target is in the "dark place." For example, when the brightness detected in step S103 is less than the predetermined threshold value, the image processing unit 210 determines the "dark place." On the other hand, when the brightness detected in step S103 is equal to or more than the predetermined threshold value, the image processing unit 210 determines that it is not the "dark place" (i.e., it is the "bright place"). When determining that the imaging target is in the "dark place" (YES), the image processing unit 210 proceeds to the process in step S111. On the other hand, when determining that the imaging target is in the "bright place" (NO), the image processing unit 210 proceeds to a process in step S109.

(Step S109) The image processing unit 210 performs control not to output infrared light from the IR light-emitting parts 123. Then, the image processing unit 210 returns to the process in step S101.

(Step S111) The image processing unit 210 outputs infrared light from the IR light-emitting parts 123. Then, the image processing unit 210 returns to the process in step S101.

Note that the order of the process of determining whether or not the face area is detected in step S105 and the process of determining whether or not it is the "dark place" in step S107 may be reversed. For example, when determining the "dark place," the image processing unit 210 may proceed to the process in step S111 without determining whether or not the face area is detected to output infrared light from the IR light-emitting parts 123. Further, when determining the "bright place," the image processing unit 210 may perform the determination process of whether or not the face area is detected, and proceed to the process in step S109 or the process in step S111 depending on whether or not the face area is detected.

Summary of First Embodiment

As described above, the information processing apparatus 1 according to the present embodiment includes: the system memory 310 (an example of a memory); the IR light-emitting parts 123 (an example of a light-emitting part), and the image processing unit 210 (an example of a processor). The system memory 310 temporarily stores RGB image data (an example of first imaging data) captured with the RGB camera 121 (first camera; an example of a first imaging function) for imaging using visible light, and IR image data (an example of second imaging data) captured with the IR camera 122 (second camera; an example of a second imaging function) for imaging using infrared light. The IR light-emitting parts 123 output infrared light toward an imaging target of the IR camera 122. The image processing unit 210 executes processing based on the RGB image data and the IR image data stored in the system memory 310. For example, based on the RGB image data stored in the system memory 310, the image processing unit 210 performs face detection processing to detect a face area with a face captured therein from an RGB image included in the RGB image data. Further, based on the RGB image data stored in the system memory 310, the image processing unit 210 performs brightness detection processing to detect the brightness of the imaging target. Then, when the brightness detected by the brightness detection processing upon imaging with the IR camera 122 is equal to or more than the predetermined threshold value (that is, in the case of the bright place), the image processing unit 210 executes the bright-place control mode (an example of a first control mode) to control the output of the IR light-emitting parts 123 depending on whether or not the face area is detected by the face detection processing. On the other hand, when the brightness detected by the brightness detection processing upon imaging with the IR camera 122 is less than the predetermined threshold value (that is, in the case of the dark place), the image processing unit 210 performs light emission control processing to execute the dark-place control mode (an example of a second control mode) in order to control the output of the IR light-emitting parts 123 regardless of detection of the face area by the face detection processing.

Thus, since the information processing apparatus 1 not only controls the output of the IR light-emitting parts 123 depending on whether or not the face area is detected from the RGB image captured with the RGB camera 121, but also controls the output of infrared light from the IR light-emitting parts 123 in the dark place regardless of detection of the face area, the face authentication function can be made to work properly while reducing power consumption.

For example, in the light emission control processing mentioned above, when the face area is detected by the face detection processing in the bright-place control mode, the image processing unit 210 outputs infrared light from the IR light-emitting parts 123, while when no face area is detected by the face detection processing, the image processing unit 210 does not output infrared light from the IR light-emitting parts 123.

Thus, when the face area is detected from the RGB image captured with the RGB camera 121, since the user on which face authentication is performed is present, the information processing apparatus 1 can make the face authentication function work by outputting infrared light from the IR light-emitting parts 123. On the other hand, when no face area is detected from the RGB image captured with the RGB camera 121, since the user on which face authentication is performed is not present, the information processing apparatus 1 performs control not to output infrared light from the IR light-emitting parts 123, thus preventing power from being consumed wastefully.

Note that when no face area is detected by the face detection processing in the bright-place control mode, the image processing unit 210 may reduce the amount of infrared light to be output from the IR light-emitting parts 123 more than the amount of infrared light to be output from the IR light-emitting parts 123 when the face area is detected. In this case, power is more consumed than in the case of performing control not to output infrared light from the IR light-emitting parts 123, but the wastefully consumed power can be reduced by reducing the amount of infrared light.

Further, in the dark-place control mode, the image processing unit 210 outputs infrared light from the IR light-emitting parts 123 in the light emission control processing mentioned above regardless of detection of the face area by the face detection processing.

Thus, since the face area is not detected in the dark place correctly from the RGB image captured with the RGB camera 121, the information processing apparatus 1 can make the face authentication function work properly by outputting infrared light from the IR light-emitting parts 123 regardless of detection of the face area.

Further, a control method for the information processing apparatus 1 according to the present embodiment includes: a face detection step of causing the image processing unit 210 to detect a face area with a face captured therein from an RGB image included in RGB image data based on the RGB image data stored in the system memory 310; a brightness detection step of causing the image processing unit 210 to detect the brightness of an imaging target based on the RGB image data stored in the system memory 310; and a light emission control step in which when the brightness detected by the brightness detection step upon imaging with the IR camera 122 is equal to or more than the predetermined threshold value (that is, in the case of the bright place), the image processing unit 210 controls output of the IR light-emitting parts 123 depending on whether or not the face area is detected by the face detection step, while when the brightness is less than the predetermined threshold value (that is, in the case of the dark place), the image processing unit 210 controls the output of the IR light-emitting parts 123 regardless of detection of the face area by the face detection step.

Thus, since the information processing apparatus 1 not only controls the output of the IR light-emitting parts 123 depending on whether or not the face area is detected from the RGB image captured with the RGB camera 121, but also outputs infrared light from the IR light-emitting parts 123 in the dark place regardless of detection of the face area, the face authentication function can be made to work properly while reducing power consumption.

Second Embodiment

Next, a second embodiment of the present invention will be described.

In the first embodiment, it is described that the face detection function used for output control of the IR light-emitting parts 123 has only to be able to detect at least a face area of a face facing the front (facing the information processing apparatus 1). However, the face detection function of the face detection unit 212 may be able to detect not only the front face but also a facial profile (i.e., a face facing left or right). In this case, the face detection unit 212 may also detect the orientation of the face in addition to the detection of the face area, and output infrared light from the IR light-emitting parts 123 when the face facing the front is detected.

Figure 7:
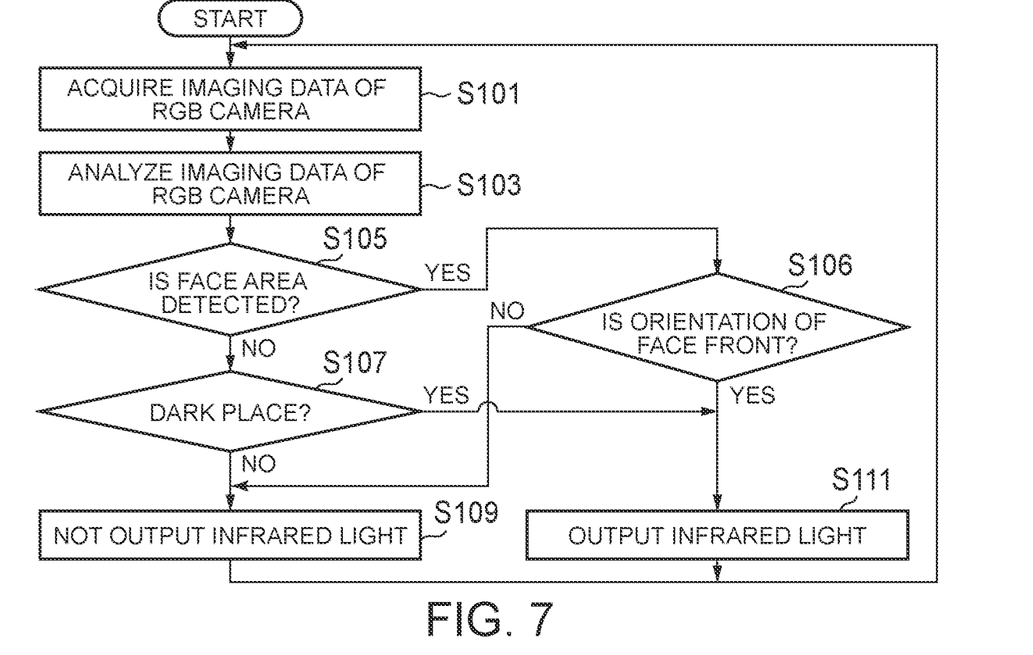
FIG. 7 is a flowchart illustrating an example of output control processing of the IR light-emitting parts according to a second embodiment.

FIG. 7 is a flowchart illustrating an example of output control processing of the IR light-emitting parts 123 according to the present embodiment. In FIG. 7, processes corresponding to the respective processes in FIG. 6 are given the same step numbers to omit the description thereof. The processing illustrated in FIG. 7 is different from the processing illustrated in FIG. 6 in that a process in step S106 is performed when the face area is detected in step S105.

(Step S106) When determining that the face area is detected from the RGB image in step S105 (YES), the image processing unit 210 determines whether or not the orientation of the face included in the detected face area is the front. When determining that the orientation of the face is the front (YES), the image processing unit 210 proceeds to the process in step S111 to output infrared light from the IR light-emitting parts 123. On the other hand, when determining that the orientation of the face is not the front (NO), the image processing unit 210 proceeds to the process in step S109 to perform control not to output infrared light from the IR light-emitting parts 123.

As described above, in the information processing apparatus 1 according to the present embodiment, the image processing unit 210 further detects the orientation of the face included in the face area when the face area is detected in the face detection processing. Then, even when the face area is detected by the face detection processing in the bright-place control mode, the image processing unit 210 controls whether or not to output infrared light from the IR light-emitting parts 123 in the light emission control processing based on the orientation of the face included in the face area. For example, even in the case where the face area is detected by the face detection processing in the bright-place control mode, when the face included in the face area is facing the front, the image processing unit 210 outputs infrared light from the IR light-emitting parts 123, while when the face does not face the front, the image processing unit 210 does not output infrared light from the IR light-emitting parts 123.

Thus, since the information processing apparatus 1 controls the output of the IR light-emitting parts 123 depending on whether or not the face area with a face facing the front captured therein is detected from the RGB image captured with the RGB camera 121, the face authentication function can be made to work properly while reducing power consumption. When a face not facing the front is detected, there is a high possibility that a face of a person who does not intend to use the information processing apparatus 1 is photobombed. Therefore, the information processing apparatus 1 can determine more accurately whether or not the user as the face authentication target is present, and when determining that the user as the face authentication target is not present, since infrared light is not output from the IR light-emitting parts 123, the information processing apparatus 1 can reduce power consumption.

Third Embodiment

Next, a third embodiment of the present invention will be described.

In the first and second embodiments, the example in which infrared light is output from the IR light-emitting parts 123 in the dark-place control mode regardless of detection of the face area is described, but this results in consuming power wastefully when no user is present. Therefore, the image processing unit 210 may also output infrared light intermittently from the IR light-emitting parts 123 in the dark-place control mode regardless of detection of the face area to reduce power consumption. For example, the image processing unit 210 may also output infrared light intermittently by repeating control to stop output for 10 seconds after outputting infrared light from the IR light-emitting parts 123 for 10 seconds. Note that the time to output infrared light and the time to stop the output can be set arbitrarily.

Further, the image processing unit 210 may detect the face area from the IR image after outputting infrared light from the IR light-emitting parts 123 regardless of detection of the face area in the dark-place control mode, and when no face area is detected, the image processing unit 210 may stop the output of infrared light from the IR light-emitting parts 123 for a certain amount of time to output infrared light intermittently.

Figure 8:
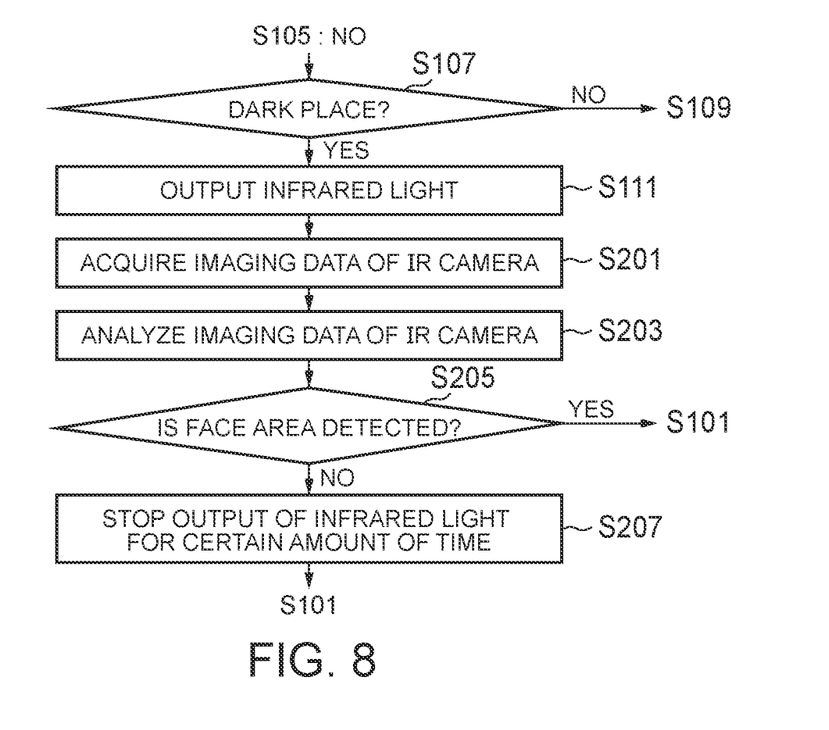
FIG. 8 is a flowchart illustrating an example of output control processing of the IR light-emitting parts according to a third embodiment.

FIG. 8 is a flowchart illustrating an example of output control processing of the IR light-emitting parts 123 according to the present embodiment. In FIG. 8, processes corresponding to the respective processes in FIG. 6 and FIG. 7 are given the same step numbers to omit the description thereof. The processing illustrated in FIG. 8 is different from the processing illustrated in FIG. 6 and the processing illustrated in FIG. 7 in processes in step S201 to step S207 after outputting infrared light from the IR light-emitting parts 123 depending on the dark place.

When determining that the imaging target is in the "dark place" in step S107 (YES), the image processing unit 210 proceeds to the process in step S111 to perform control to output infrared light from the IR light-emitting parts 123. Then, the image processing unit 210 proceeds to a process in step S201.

Note that when the face area is detected in step S105 of FIG. 6 (YES), and when determining in step S106 of FIG. 7 that the orientation of the face detected is the front (YES), the image processing unit 210 proceeds to the process in step S111 in the same way, but the image processing unit 210 returns to the process in step S101 without proceeding to a process in step S201 after that.

(Step S201) The image processing unit 210 acquires IR image data captured with the IR camera 122 from the system memory 310. Then, the image processing unit 210 proceeds to a process in step S203.

(Step S203) The image processing unit 210 analyzes the IR image data acquired in step S201. For example, the image processing unit 210 detects a face area from an IR image included in the IR image data. Then, the image processing unit 210 proceeds to a process in step S205.

(Step S205) The image processing unit 210 determines whether or not the face area is detected from the IR image in step S203. When determining that the face area is detected from the IR image (YES), the image processing unit 210 returns to the process in step S101. On the other hand, when determining that no face area is detected from the IR image (NO), the image processing unit 210 proceeds to a process in step S207.

(Step S207) The image processing unit 210 stops the output of infrared light from the IR light-emitting parts 123 for a certain amount of time (for example, for 10 seconds). Then, the image processing unit 210 returns to the process in step S101.

Thus, after outputting infrared light from the IR light-emitting parts 123 in the light emission control processing regardless of detection of the face area in the dark-place control mode, the image processing unit 210 detects, in the face detection processing, a face area with a face captured therein from an IR image included in IR image data based on the IR image data stored in the system memory 310. Then, when no face area is detected from the IR image, the image processing unit 210 stops the output of infrared light from the IR light-emitting parts 123 for the certain amount of time.

Thus, even in the dark place, when it can be determined that the face authentication function is unnecessary, since information processing apparatus 1 stops the output of infrared light from the IR light-emitting parts 123 for the certain amount of time, power can be prevented from being consumed wastefully.

Fourth Embodiment

Next, a fourth embodiment of the present invention will be described.

In the first to third embodiments, such a configuration that the RGB camera 121 for capturing an RGB image and the IR camera 122 for capturing an IR image are provided in the information processing apparatus 1 as individual cameras is described, but one hybrid camera with the RGB camera 121 and the IR camera 122 integrated therein may also be provided.

Figure 9:
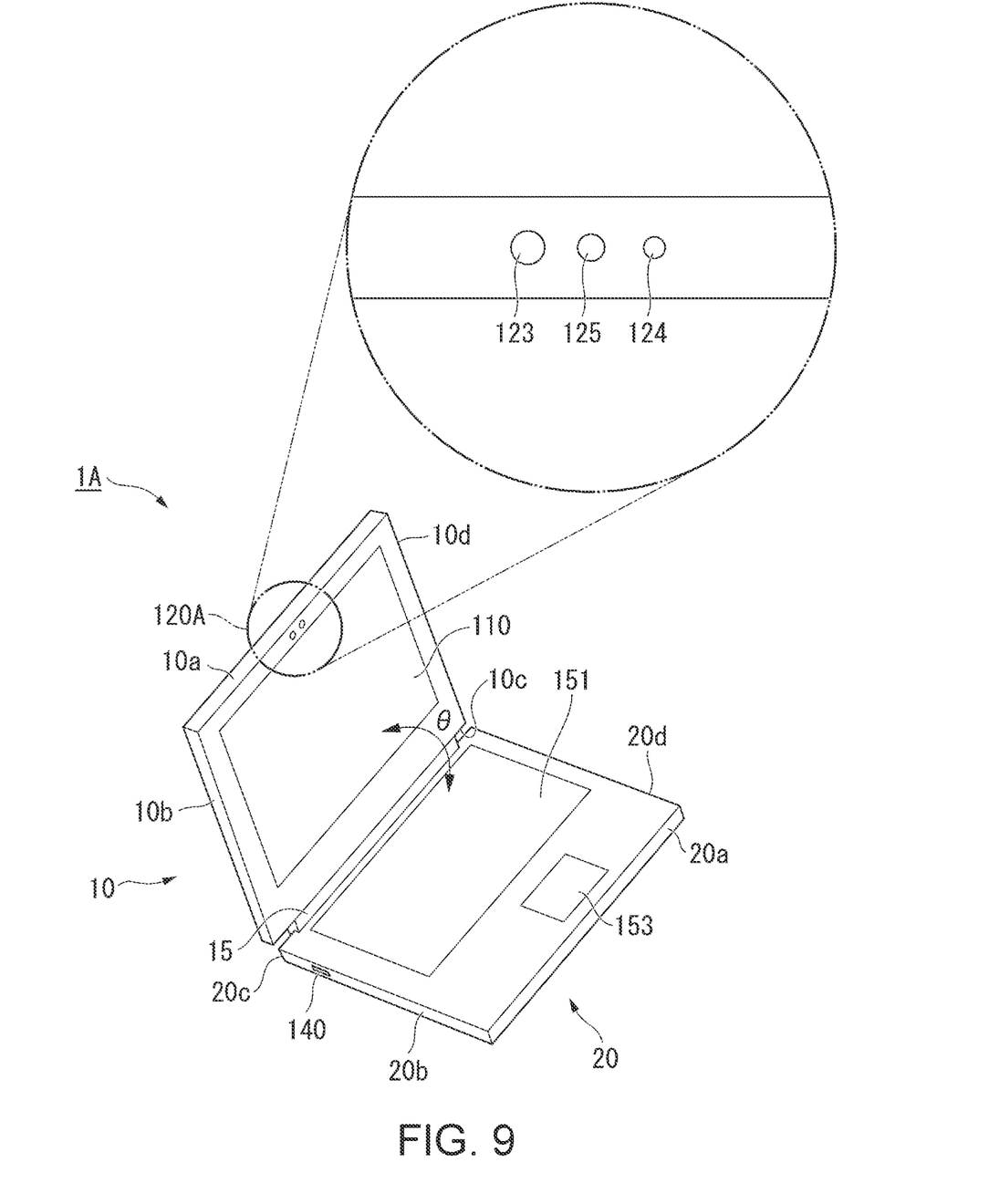
FIG. 9 is a perspective view illustrating an appearance configuration example of an information processing apparatus according to a fourth embodiment.

FIG. 9 is a perspective view illustrating an appearance configuration example of an information processing apparatus 1A according to this embodiment. In FIG. 9, components corresponding to the respective units illustrated in FIG. 1 are given the same reference numerals to omit the description thereof. The configuration of a camera unit 120A in the information processing apparatus 1A illustrated in FIG. 9 is different from the camera unit 120 illustrated in FIG. 1. The camera unit 120A includes a hybrid camera 125, an IR light-emitting part 123, and the indicator 124.

The hybrid camera 125 is configured to include a hybrid image sensor in which R pixels, G pixels, and B pixels, and IR pixels are arranged on one image sensor. The hybrid camera 125 can output both RGB image data obtained by photoelectrically converting visible light incident on the R pixels, the G pixels, and the B pixels, and IR image data obtained by photoelectrically converting light including infrared light incident on the IR pixels.

Using the RGB image data and the IR image data output from this hybrid camera 125, output control processing of the IR light-emitting part 123 as described in the first to third embodiments can be realized.

Thus, the information processing apparatus 1A includes one hybrid camera 125 (an example of one camera) that outputs both RGB image data (the example of the first imaging data), captured by an imaging function (first imaging function) for capturing an RGB image, and IR image data (the example of the second imaging data) captured by an imaging function (second imaging function) for capturing an IR image.

Thus, since the information processing apparatus 1A can not only control the output of the IR light-emitting part 123 depending on whether or not a face area is detected from an RGB image captured with the hybrid camera 125, but also can control the output of infrared light from the IR light-emitting part 123 in a dark place regardless of detection of the face area, the face authentication function can be made to work properly while reducing power consumption in the same manner as in the case of using the RGB camera 121 and the IR camera 122.

While the respective embodiments of this invention have been described in detail above with reference to the accompanying drawings, the specific configurations are not limited to the above-described embodiments, and design changes are included without departing from the scope of this invention. For example, the respective configurations described above in the respective embodiments can be combined arbitrarily.

Note that in the aforementioned embodiments, the configuration examples in each of which the camera unit 120 (120A) is built in the information processing apparatus 1 (1A) are described, but the present invention is not limited to these examples. For example, the camera unit 120 (120A) does not have to be built in the information processing apparatus 1 (1A), which may also be attachable to the information processing apparatus 1 (1A) (for example, onto any of the side faces 10a, 10b, 10c, and the like) as an external accessory, and communicably connected to the information processing apparatus 1 (1A) wirelessly or by wire.

Further, in the aforementioned embodiments, the example in which the image processing unit 210 is provided separately from the EC 200 is illustrated, but some or all of the functions of the image processing unit 210 may be provided in the EC 200, or some or all of the functions of the image processing unit 210 and the EC 200 may be configured as one package. Further, some or all of the functions of the image processing unit 210 may be provided in the system processing unit 300, or some or all of the functions of the image processing unit 210 and some or all of the functions of the system processing unit 300 may be configured as one package. Further, some or all of the functions of the image processing unit 210 may be implemented as a functional component of any processing unit other than the EC 200 (for example, of the system processing unit 300).

Note that the information processing apparatus 1 (1A) described above has a computer system therein. Then, a program for implementing the function of each component included in the information processing apparatus 1 (1A) described above may be recorded on a computer-readable recording medium so that the program recorded on this recording medium is read into the computer system and executed to perform processing in each component included in the information processing apparatus 1 (1A) described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a portable medium like a flexible disk, a magneto-optical disk, a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1 (1A), or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 (1A) in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Note that the information processing apparatus 1 (1A) is not limited to the laptop PC, and it may also be a desktop PC, a tablet terminal device, or a smartphone.

DESCRIPTION OF SYMBOLS 1, 1A information processing apparatus
10 first chassis
20 second chassis
15 hinge mechanism
110 display unit
120, 120A camera unit
121 RGB camera
122 IR camera
123 IR light-emitting part
124 indicator
125 hybrid camera
130 acceleration sensor
140 power button
150 input device
151 keyboard
153 touch pad
160 video output terminal
200 EC
210 image processing unit
211 imaging data acquisition unit
212 face detection unit
213 brightness detection unit
214 light emission control unit
215 face authentication unit
300 system processing unit
302 CPU
304 GPU
306 memory controller
308 I/O controller
310 system memory
320 sleep processing unit
350 communication unit
360 storage unit
400 power supply unit

What is claimed is:

1. An information processing apparatus comprising:
a memory which temporarily stores first imaging data, captured by a first imaging function for imaging using visible light, and second imaging data captured by a second imaging function for imaging using infrared light;
a light-emitting part which outputs infrared light toward an imaging target by the second imaging function; and
a processor which executes processing based on the first imaging data and the second imaging data stored in the memory, wherein the processor performs:
   face detection processing to detect a face area with a face captured therein from an image included in the first imaging data based on the first imaging data stored in the memory,
   brightness detection processing to detect brightness of the imaging target based on the first imaging data stored in the memory, and
   light emission control processing in which when the brightness detected by the brightness detection processing is equal to or more than a predetermined threshold value upon imaging by the second imaging function, a first control mode to control output of the light-emitting part is executed depending on whether or not the face area is detected by the face detection processing, while when the brightness is less than the predetermined threshold value, a second control mode to control the output of the light-emitting part is executed regardless of detection of the face area, wherein
   in the light emission control processing, the processor outputs infrared light from the light-emitting part in the first control mode when the face area is detected, and does not output infrared light from the light-emitting part when the face area is not detected,
   in the face detection processing, the processor detects an orientation of a face included in the face area when the face area is detected, and
   in the light emission control processing, the processor controls whether or not to output infrared light from the light-emitting part in the first control mode based on the orientation of the face included in the face area even when the face area is detected.

2. The information processing apparatus according to claim 1, wherein in the light emission control processing, the processor outputs infrared light from the light-emitting part in the second control mode regardless of detection of the face area.

3. The information processing apparatus according to claim 2, wherein in the light emission control processing, the processor outputs infrared light intermittently from the light-emitting part in the second control mode regardless of detection of the face area.

4. The information processing apparatus according to claim 2, wherein in the second control mode, after outputting infrared light from the light-emitting part regardless of detection of the face area in the light emission control processing, the processor detects, in the face detection processing, a face area with a face captured therein from an image included in the second imaging data based on the second imaging data stored in the memory, and when the face area is not detected, the processor stops the output of infrared light from the light-emitting part for a certain amount of time.

5. The information processing apparatus according to claim 4, further comprising:
a first camera which outputs the first imaging data by the first imaging function; and
a second camera which outputs the second imaging data by the second imaging function.

6. The information processing apparatus according to claim 4, further comprising one camera which outputs both the first imaging data by the first imaging function and the second imaging data by the second imaging function.

7. A control method for an information processing apparatus including: a memory which temporarily stores first imaging data, captured by a first imaging function for imaging using visible light, and second imaging data captured by a second imaging function for imaging using infrared light; a light-emitting part which outputs infrared light toward an imaging target by the second imaging function; and a processor which executes processing based on the first imaging data and the second imaging data stored in the memory, the control method comprising:

causing the processor to detect a face area with a face captured therein from an image included in the first imaging data based on the first imaging data stored in the memory;

causing the processor to detect brightness of the imaging target based on the first imaging data stored in the memory;

causing, when the brightness detected is equal to or more than a predetermined threshold value upon imaging by the second imaging function, the processor to control output of the light-emitting part depending on whether or not the face area is detected, while when the brightness is less than the predetermined threshold value, the processor to control the output of the light-emitting part regardless of detection of the face area;

causing the processor to output infrared light from the light-emitting part when the face area is detected, and to not output infrared light from the light-emitting part when the face area is not detected;

causing the processor to detect an orientation of a face included in the face area when the face area is detected; and causing the processor to control whether or not to output infrared light from the light-emitting part based on the orientation of the face included in the face area even when the face area is detected.

* * * * *